(12) United States Patent
Budhai et al.

(10) Patent No.: US 9,229,846 B1
(45) Date of Patent: Jan. 5, 2016

(54) TESTING APPLICATION CODE CHANGES USING A STATE ASSERTION FRAMEWORK

(71) Applicant: SAP SE, Walldorf (DE)

(72) Inventors: Roy Budhai, Richmond (CA); Brian Chen, Burnaby (CA); Teresa Su, Vancouver (CA); Sheldon Sequeira, North Vancouver (CA)

(73) Assignee: Business Objects Software, Ltd., Dublin (IE)

( * ) Notice: Subject to any disclaimer, the term of this patent is extended or adjusted under 35 U.S.C. 154(b) by 0 days.

(21) Appl. No.: 14/500,859

(22) Filed: Sep. 29, 2014

Related U.S. Application Data (60) Provisional application No. 62/044,085, filed on Aug. 29, 2014.

(51) Int. Cl.
*G06F 9/44* (2006.01)
*G06F 11/36* (2006.01)

(52) U.S. Cl.
CPC .......... *G06F 11/3672* (2013.01); *G06F 11/368* (2013.01); *G06F 11/3696* (2013.01)

(58) Field of Classification Search
CPC ............ G06F 11/3672; G06F 11/3696; G06F 11/368; G06F 11/3466; G06F 11/3636
USPC ......................................................... 717/130
See application file for complete search history.

(56) References Cited

U.S. PATENT DOCUMENTS

| 6,745,383 B1* | 6/2004 | Agarwal | G06F 11/3495 |
| | | | 714/39 |
| 2004/0054992 A1* | 3/2004 | Nair | G06F 8/443 |
| | | | 717/138 |
| 2005/0240737 A1* | 10/2005 | Holt | G06F 9/445 |
| | | | 711/148 |

OTHER PUBLICATIONS

"What is Selenium?" 2 pp., downloaded from http://www.seleniumhq.org/ on Aug. 21, 2014.

* cited by examiner

*Primary Examiner* — Anna Deng
(74) *Attorney, Agent, or Firm* — Klarquist Sparkman, LLP (57) ABSTRACT

Systems and methods are disclosed for analyzing application code changes. The method may include adding instrumentation code to a selected one or more of a plurality of software objects associated with an application, when a corresponding object class for the selected software objects matches at least one preferred object class. In response to at least one application-related event, detecting using the instrumentation code, one or more state changes of the selected software objects or one or more communications between at least two of the selected software objects. At least one baseline assertion may be generated using the instrumentation code based on the one or more state changes or communications. A notification may be generated upon detecting at least one subsequent assertion that does not match the at least one baseline assertion. A list with the at least one preferred object class may be accessed in a configuration file.

15 Claims, 11 Drawing Sheets

TESTING APPLICATION CODE CHANGES USING A STATE ASSERTION FRAMEWORK

CROSS-REFERENCE TO RELATED APPLICATIONS/INCORPORATION BY REFERENCE

This application makes reference to and claims priority to U.S. Provisional Application Ser. No. 62/044,085, filed on Aug. 29, 2014, entitled "TESTING APPLICATION CODE CHANGES USING A STATE ASSERTION FRAMEWORK," which is incorporated herein by reference in its entirety.

BACKGROUND

As enterprises accumulate ever-greater amounts of data on their transactions, processes, products, and operations, online analytical processing has become an important part of doing business. The number of tools and techniques addressing analytical processing has grown, enabling data analysts to quickly analyze and navigate through vast and complex collections of data using processing software and platforms. In a computing environment with many computing devices, such as a network environment (e.g., a cloud computing environment or other network environments) with many server computers, the use of computing resources can provide a number of advantages including cost advantages and/or the ability to adapt rapidly to changing computing resource needs.

With the increased use of computing resources, reliability of software deployment is essential. For example, deploying new software to a server can result in a misconfiguration or unintended changes being introduced with the new software resulting in the server being in some way impaired or degraded. Therefore, testing application code during software development is an essential part of reliable software deployment in a network environment.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In an example aspect of the disclosure, a computer-implemented method of developing a user interface is disclosed and may include adding instrumentation code to a selected one or more of a plurality of software objects associated with an application, when a corresponding object class for the selected software objects matches at least one preferred object class. In response to at least one application-related event, detecting using the instrumentation code, one or more state changes of the selected software objects or one or more communications between at least two of the selected software objects. At least one baseline assertion may be generated using the instrumentation code based on the one or more state changes or communications. A notification may be generated upon detecting at least one subsequent assertion that does not match the at least one baseline assertion. A list with the at least one preferred object class may be accessed in a configuration file.

In another aspect of the disclosure, a computer-readable storage is disclosed and may include instructions for executing a method for analyzing application code changes. The method may include receiving a plurality of file components for an application, each file component associated with at least one of a plurality of object classes. Instrumentation code may be added to at least one of the plurality of file components, when an object class for the at least one file component matches at least one preferred object class. One or more software objects associated with the at least one file component may be monitored using the instrumentation code. Upon detecting a state change in the one or more software objects, at least one received input instruction causing the state change may be stored. An assertion associated with the state change may be generated using the instrumentation code. The stored at least one input instruction may be replayed to verify the assertion.

In yet another aspect of the disclosure, a computing device is disclosed which includes a processor and a memory. The computing device may be adapted to perform a method for analyzing application code changes. The method may include retrieving a plurality of instructions, where the instructions are associated with at least one an input to an application. The at least one input may cause a first state change in at least one software object of the application. A first assertion result may be retrieved, where the first assertion result may be based on an assertion generated by an instrumentation code within the application and associated with the first state change. While executing the retrieved plurality of instructions, the at least one software object may be monitored using the instrumentation code. Upon detecting a second state change in the at least one software object, a second assertion result may be determined using the assertion. The first and second assertion results may be compared. A determination may be performed as to whether or not to refactor code of the application based on the comparison.

As described herein, a variety of other features and advantages can be incorporated into the technologies as desired.

DETAILED DESCRIPTION

The technologies described herein can be used in an application code development and testing environment. More specifically, a State Assertion Framework (SAF) may implement one or more of the technologies described herein during, for example, regression testing of application code, as a "capture and replay" tool (i.e., test case generation and subsequent replay), and as an assertion framework (i.e., generate one or more assertions during the test case generation, and verify the assertions in the replay stage). During the "capture and replay", developers may record their interactions with a web application with the intention of simulating these actions at a later time. For a deterministic application, this would allow developers to ensure that their application behaves as expected from the end-user's perspective without the need for frequent manual input.

In object-oriented programming languages, such as JavaScript, a running application may be represented as objects. As an assertion framework, SAF may be used to monitor the behavior of a subset of objects and to compare their characteristics to those of a known benchmark (e.g., an assertion). In addition to automatically generating an initial benchmark assertion (which may be considered the correct behavior for an object), SAF may also allow developers to update the known benchmark assertion for a test case, if the new behavior of their application is deviating from it. In addition to tracking characteristics of a programming object, SAF may also be used to track the creation of a specific type of object, such as events. Events are a subset of objects, which are employed in a number of design patterns (e.g. Model-View-Controller design pattern) in order to drive the behavior of an application. Various components of a single application often use events in order to communicate with each other. In this regard, SAF may be used to insert instrumentation code within the monitored application code in order to track events by tracking communications between application components (e.g., between the Model, View and/or Controller component of the application).

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

As used herein, the term "application program" (sometimes shortened to application) can refer to any program designed to perform a specific function directly for the user or, in some cases, for another application program. Examples of application programs include word processors; database programs; Web browsers; network administration tools; development tools; drawing, paint, and image editing programs; and communication programs. Application programs use the services of the computer's operating system and other supporting programs.

As used herein, the term "model-view-controller" refers to a software architectural design pattern, which divides a software application into three interconnected components, separating internal representations of information from ways information is presented to or accepted by a user. A more detailed view of the "model-view-controller" design pattern is illustrated in reference to FIG. 2.

As used herein, the term "assertion" is a true-false statement placed in a program (e.g., application code) to indicate that a predicate designated by the assertion is true at the place in the program where the assertion is inserted. In instances when an assertion evaluates to false at run-time, an assertion failure results and the code execution is aborted.

Figure 1:
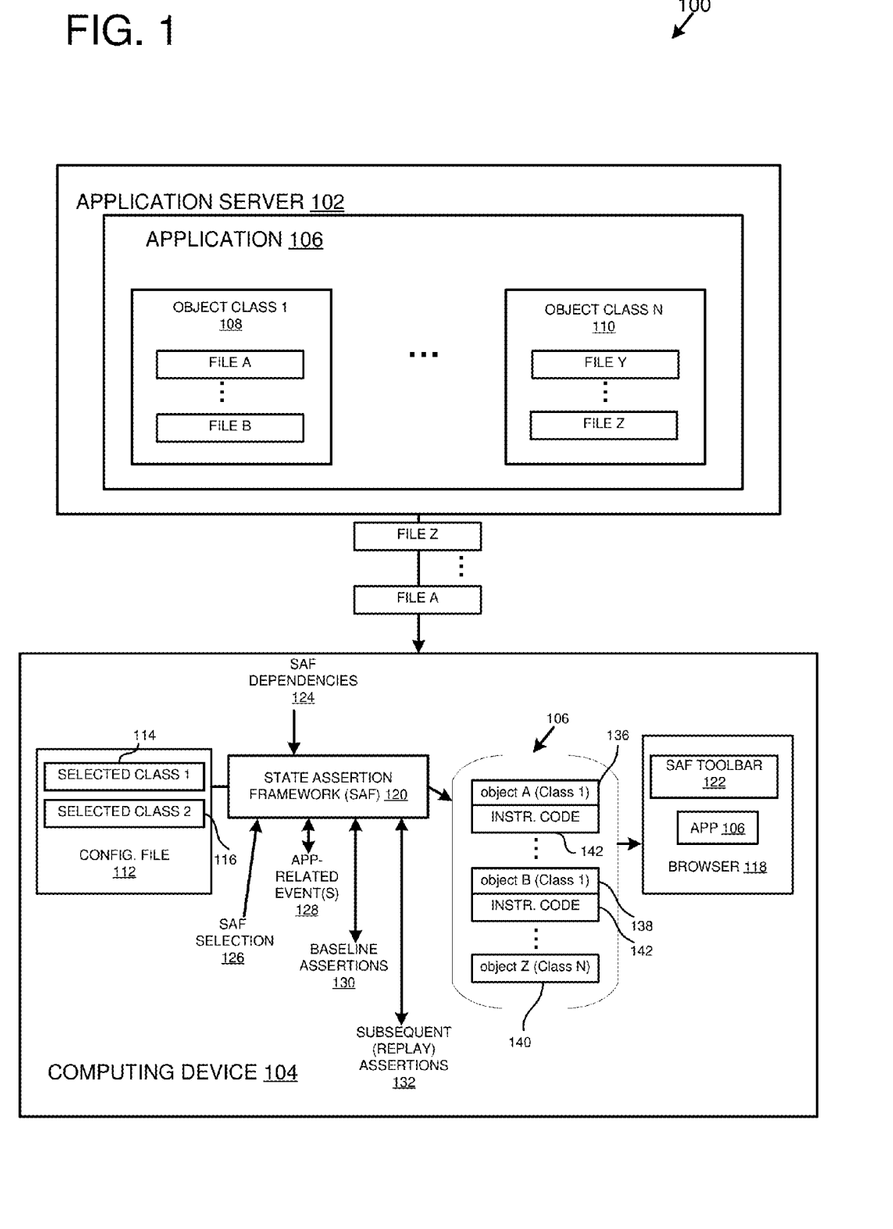
FIG. 1 is a block diagram of an interaction between an application server and a computing device implementing a state assertion framework (SAF) for application code testing, in accordance with an example embodiment of the disclosure.

FIG. 1 is a block diagram of an interaction between an application server and a computing device implementing a state assertion framework (SAF) for application code testing, in accordance with an example embodiment of the disclosure. Referring to FIG. 1, the communication system 100 may include an application server 102 communicatively coupled with a computing device 104. The application server 102 may comprise suitable logic, circuitry, interfaces, and/or code and may be operable to provide access (e.g., for downloading) to one or more applications, such as application 106. The application 106 may be, for example, a browser-based application (or any other type of application), and may include a plurality of file components, such as files A, . . . , Z. The file components A, . . . , Z may be associated with one or more object classes 108, . . . , 110, as seen in FIG. 1.

The computing device 104 can be a smart phone or other wireless phone, a laptop or netbook computer, a tablet or notepad computer, a wearable computer, a mobile station, an entertainment appliance, an audio and/or video playback device, a game console, an automotive computer, and so forth. The computing device 104 can also be referred to as being a mobile device because the device 104 may be designed or intended to be moved to multiple different locations (e.g., taken by a user with him or her as the user goes to different locations).

The computing device 104 may comprise suitable logic, circuitry, interfaces, and/or code and may be operable to implement a state assertion framework (SAF) performing the functionalities described herein. The SAF may be implemented as a separate application or as part of an operating system for the device 104.

In operation, the SAF may be used to perform static and dynamic analyses. To track the state of a given object within an application and to monitor the communication between various components (via events), the SAF may perform the static analysis of an application's implementing code (e.g., software objects 136, ..., 140). During the static analysis, the instrumentation code 142 may be added to one or more of the object classes (e.g., 136, ..., 138) in order to extract information during the dynamic analysis performed during runtime. Even though the SAF 120 is illustrated in reference with a browser-based application 106 (running within browser 118), the specification may not be limited in this way and the SAF 120 may also function in non-browser based application testing environment.

Figure 4:
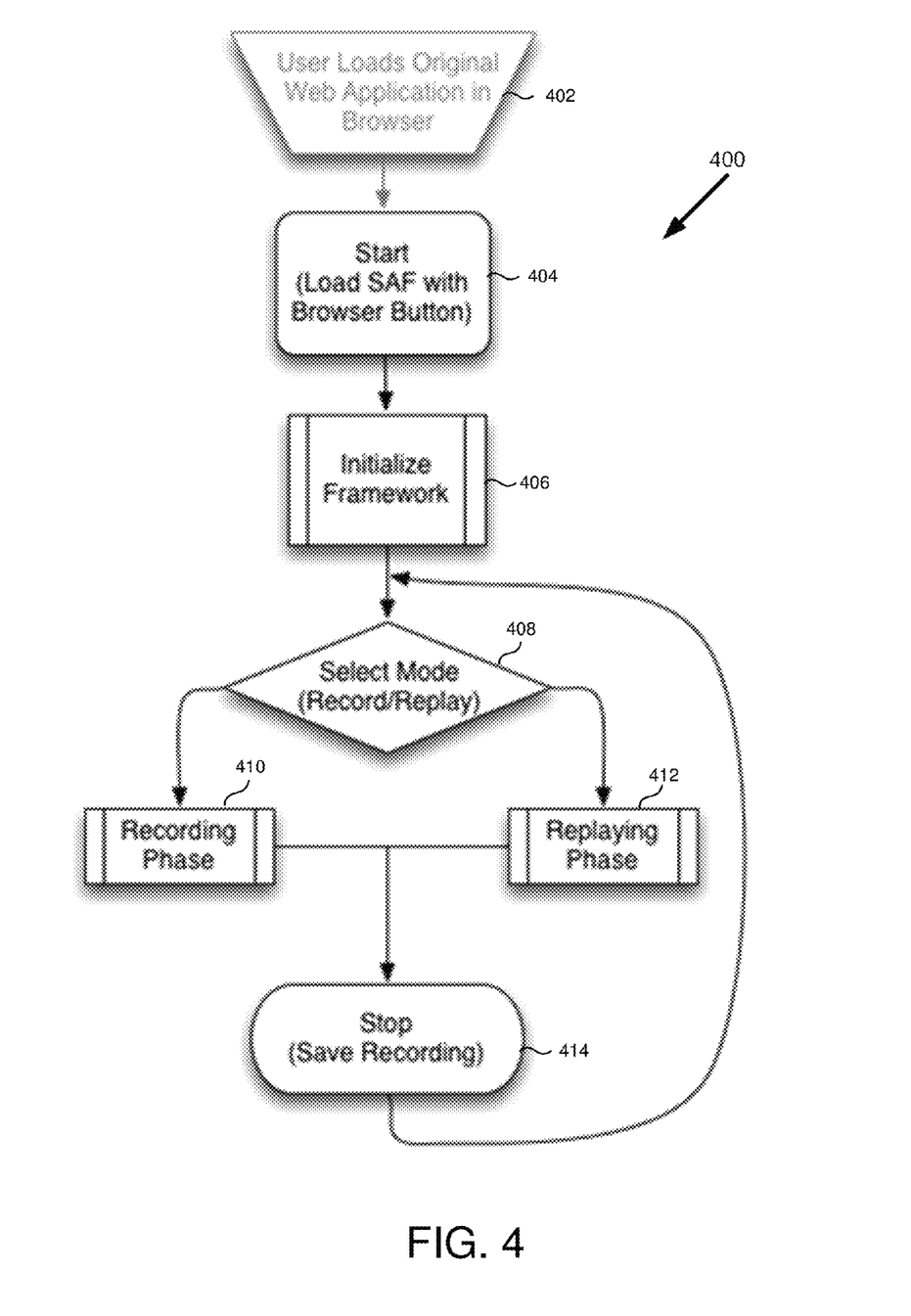
FIG. 4 is a flowchart of an example use case of the SAF of FIG. 1, in accordance with an example embodiment of the disclosure.

FIG. 4 is a flowchart 400 of an example use case of the SAF of FIG. 1, in accordance with an example embodiment of the disclosure. At 402, the original application 106 may be loaded in browser 118. The application 106 may be an application that uses program code currently being developed or tested.

At 404, the SAF 120 may be loaded (started) when the SAF selection signal 126 is received at the device 104. The SAF selection signal 126 may be generated by, e.g., activating a software button by a user or by another user input.

At 406, the SAF 120 may be initialized and the static analysis may be performed. More specifically, the SAF 120 may access a configuration file (e.g., 112) with one or more selected object classes (e.g., 114-116). As portions of the application 106 are being loaded (files A, ..., Z), the SAF 120 may check the class of software objects associated with the application 106 (e.g., objects 136, ..., 140) against the selected classes 114-116. If there is a match (i.e., the object class of a received file segment 136, ..., 138 matches the selected classes 114-116 in the configuration file 112), then the instrumentation code 142 is appended (or added) to the software object (instrumentation code 142 is added to objects 136, ..., 138 as seen in FIG. 1). By instrumenting application code of application 106 (i.e., inserting instrumentation code 142), the SAF 120 may track the application flow of execution. The SAF 120 may capture and update the state of multiple objects (e.g., 136, ..., 138) during the application's execution. Such states may be used as benchmarks (e.g., assertions generated during the recording phase of the dynamic analysis) during the replay phase to assert that an application is behaving correctly.

Figure 2:
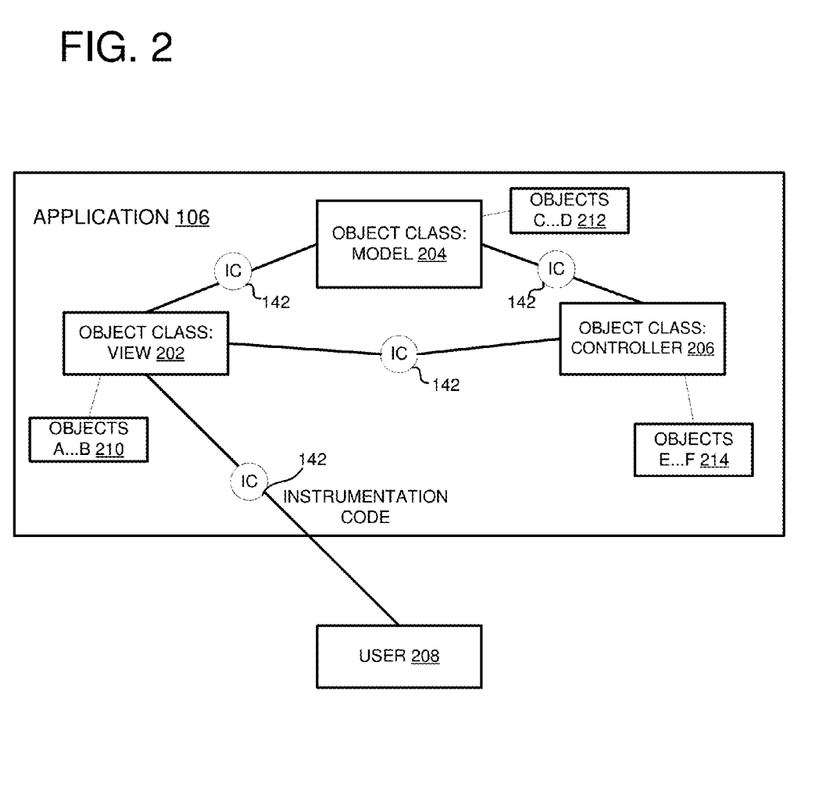
FIG. 2 is a block diagram of an application implementing instrumentation code, in accordance with an example embodiment of the disclosure.

The added instrumentation code 142 may also be used to capture the occurrence of intra-application events defined by the original application's developers (used as communication between modules as seen in the Model-View-Controller design pattern). FIG. 2 is a block diagram of an application implementing instrumentation code, in accordance with an example embodiment of the disclosure. Parts of the application 106 may be associated with one of an object class view 202, an object class model 204 or object class controller 206. The view 202, model 204 and controller 206 may have corresponding software objects 210, 212, and 214, respectively, associated with them. The view 202 may present an output to the user 208. Additionally, actions of user 208 on the view 202 may trigger behavior (e.g., performance of an object-related action) by the controller 206.

The controller 206 can be operable to send commands to the model 204 to update the model's state (e.g., editing a document). The controller 206 can also send commands to its associated view 202 to change the view's presentation of the model (e.g., by scrolling through a document), or may act upon actions triggered by the user 208 on the view 202. The model 204 may notify its associated view 202 and controller 206 when there has been a change in its state. Such notification allows the view 202 to generate an updated output (e.g., for user 208), and the controller 206 to change the available set of commands. The view 202 may request information from the model 204 that it uses to generate an output representation to the user 208.

Often in complex web applications, lower-level events, such as those from mouse clicks initiated by user 208, may be abstracted into application-specific events that are used as a form of communication between different components of application 106 (i.e., a layer between user actions in the browser environment and the application's code). Since such events are implemented in a programming language as well (e.g., JavaScript), the SAF 120 may capture them as well using the instrumentation code 142.

During the static analysis phase, the SAF 120 may add instrumentation code 142 between the various user-model-view-controller connections, as seen in FIG. 2. In this regard, the SAF 120 may use the instrumentation code 142 to track events and, consequently, track communications between the various components (e.g., objects 210-214) within the application 106. By tracking the events/communications, the SAF 120 may generate one or more alerts or recommendations using, for example, an assertion generated during the recording phase, as explained below.

Figure 3:
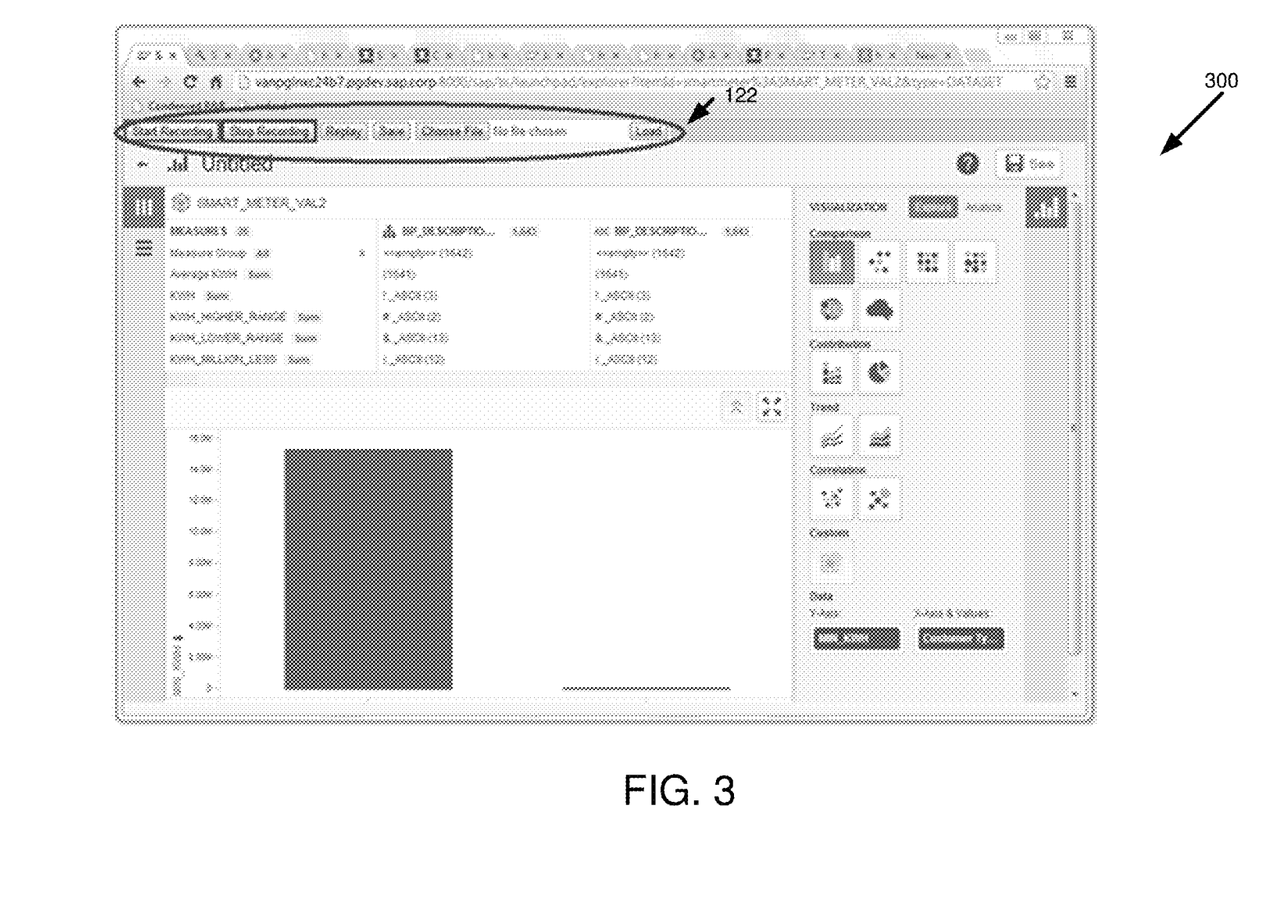
FIG. 3 is a diagram of an example user interface generated by the state assertion framework of FIG. 1, in accordance with an example embodiment of the disclosure.

The SAF initialization at 406 may also include installation of a user interface (e.g., a toolbar) 122 within the browser 118. FIG. 3 is a diagram 300 of an example user interface generated by the state assertion framework of FIG. 1, in accordance with an example embodiment of the disclosure. As seen in FIG. 3, the SAF 120 may append the tool bar 122 to the top of the browser window where the application 106 is running. The toolbar 122 may include "Start Recording" and "Stop Recording" buttons to start and stop a recording phase during the dynamic analysis. The toolbar 122 may also include a "Replay" button to initiate a replay of stored command sequence, as well as other buttons (e.g., Save, Choose File, Load, and so forth) associated with manipulating a file with a recorded command sequence (e.g., recorded during the recording phase, as explained in reference to FIG. 6 below. In this regard, once added, the toolbar 122 provides the ability to record or replay user interactions with the application 106 through the web browser 118.

Figure 8:
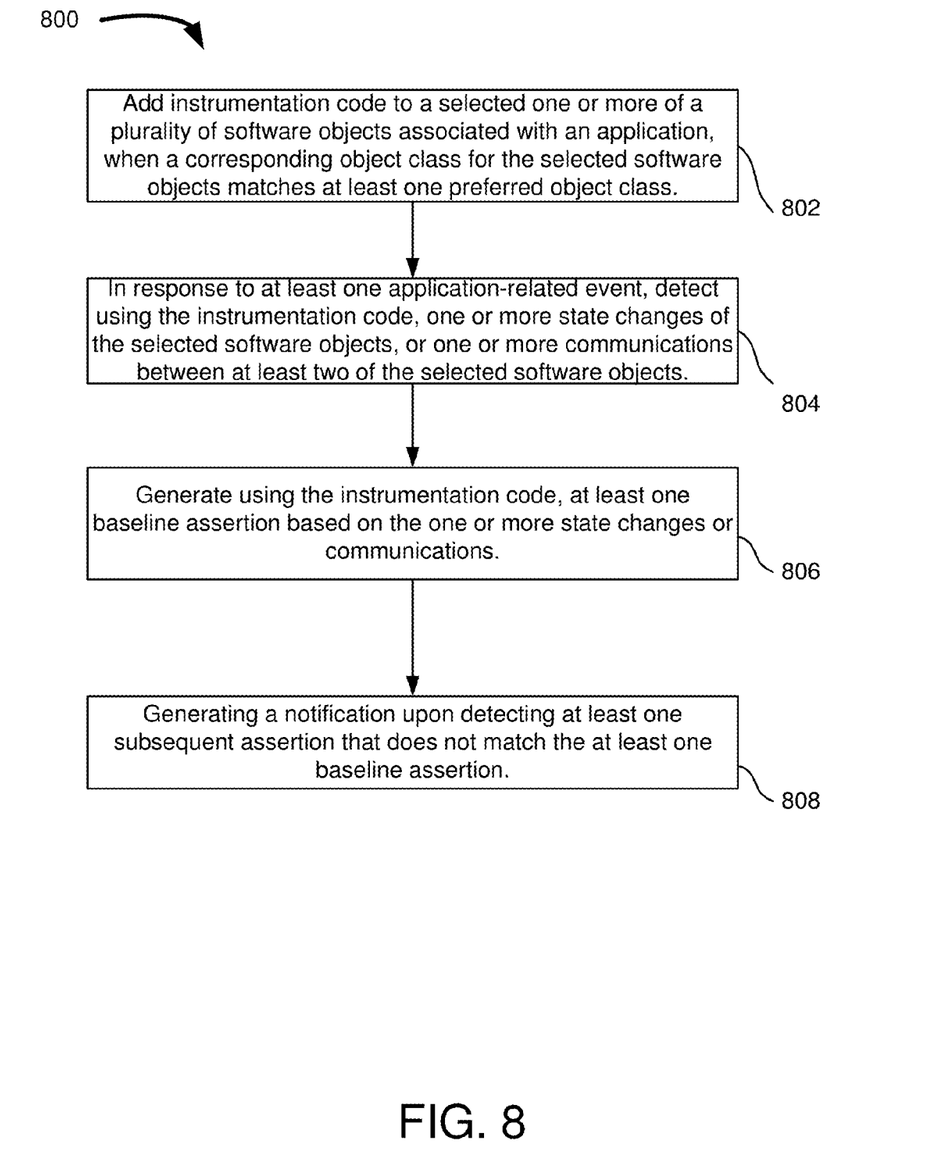
FIGS. 8-10 are flowcharts of example methods for analyzing application code changes, in accordance with an example embodiment of the disclosure.

At 408, the toolbar 122 may be used to select the record phase 410 (explained in FIG. 6) or the replay phase 412 (explained in FIG. 8). User actions and the related software object state changes may be captured during the recording phase 410. Conversely, the same actions may be simulated during the replay phase 412, at which time the original state changes are compared with the current state changes, thereby allowing for testing of application code changes for application 106.

Figure 5:
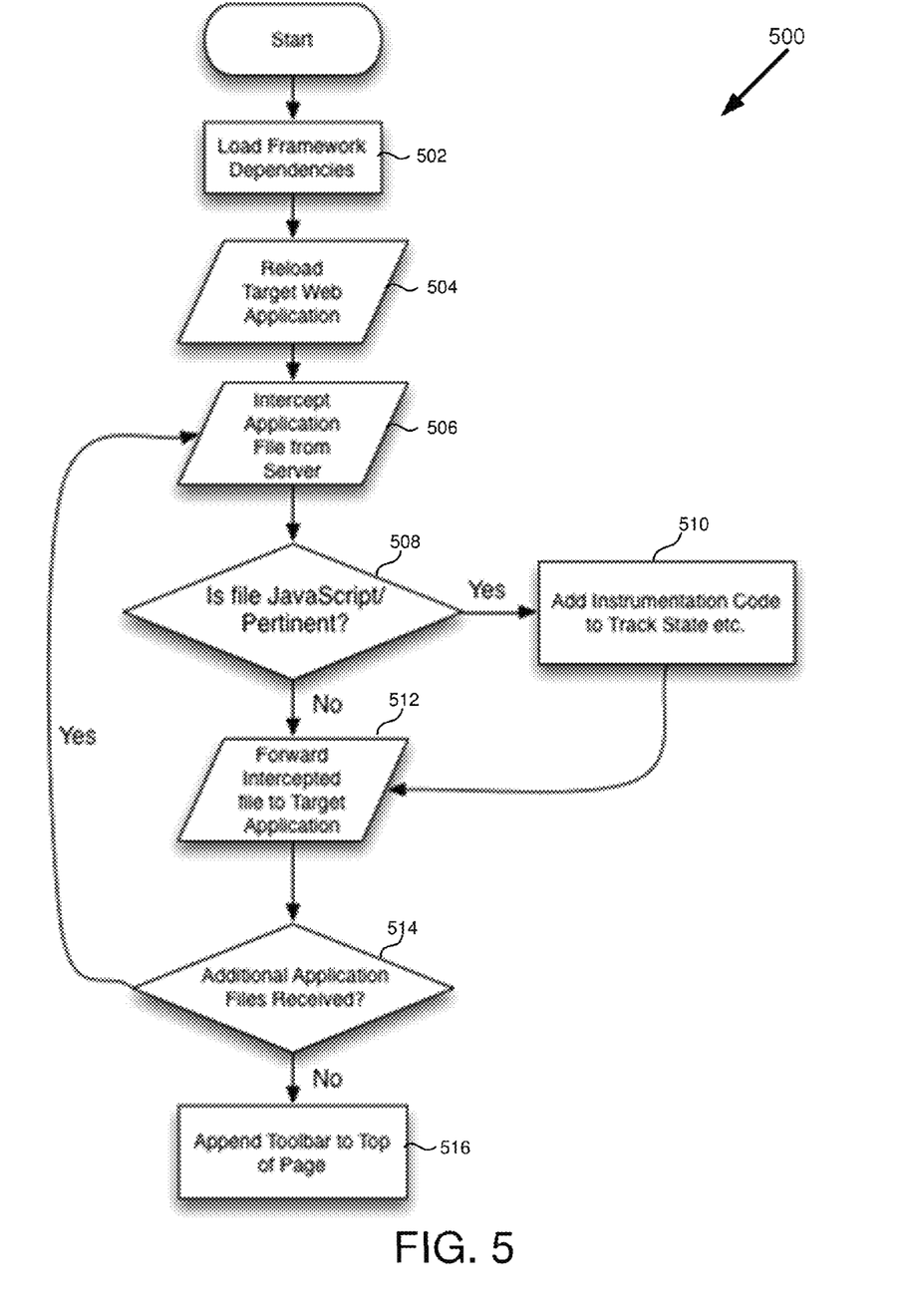
FIG. 5 is a flowchart of an example SAF initialization sequence, in accordance with an example embodiment of the disclosure.

FIG. 5 is a flowchart of an example SAF initialization sequence, in accordance with an example embodiment of the disclosure. Referring to FIGS. 1-5, the example initialization sequence 500 may start at 502, when framework dependencies may be loaded. More specifically, SAF dependencies 124 may be accessed by the SAF 120. The SAF dependencies 124 may include one or more configuration, data or other type of files, which may be used by the instrumentation code 142. At 504, the application 106 may be re-loaded into the browser 118. More specifically, the application components (e.g., files A, ..., Z) may be re-loaded from the application server 102, which allows the SAF 120 to inspect software objects associated with the received files A, ..., Z in order to determine whether to inject/add instrumentation code 142. In this regard, while being reloaded, all file components A, ..., Z (which may be, e.g., JavaScript files) for the application 106 are intercepted (at 506) and analyzed by the SAF 120 as they are received from the application server 102.

Figure 6:
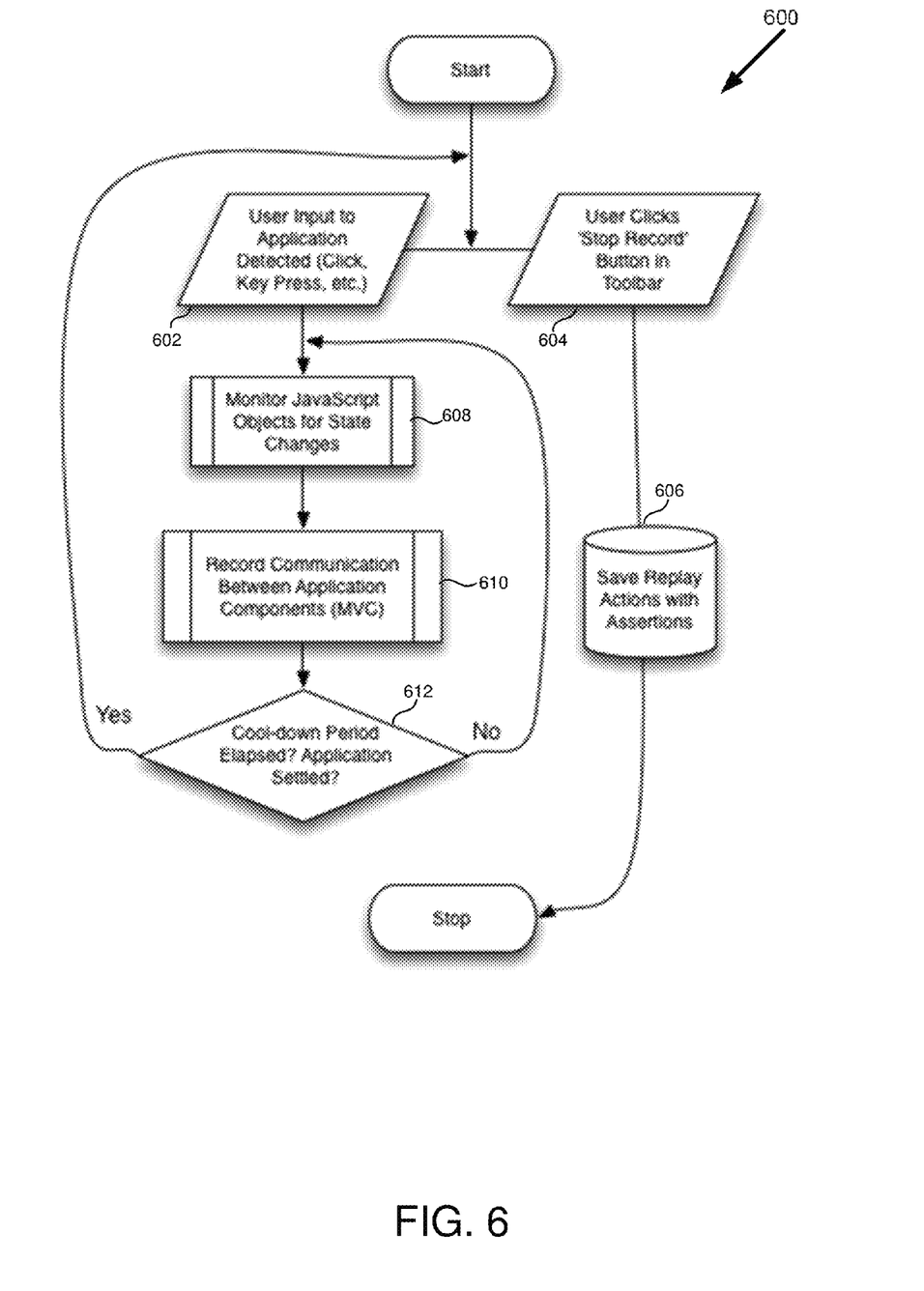
FIG. 6 is a flowchart of an example recording algorithm used by the SAF of FIG. 1, in accordance with an example embodiment of the disclosure.

At 508, the SAF 120 may determine if the intercepted file is pertinent. For example, the object class for one or more software objects (e.g., 136, . . . , 138) may be compared to the selected class 114-116 in the configuration file 112. If there is a match, then the component can be deemed relevant and, at 510, instrumentation code 142 may be added to the object (136, . . . , 138). In this regard, before being passed to the application 106 (at 512), additional code is added (at 510) to the intercepted application code in order to track object states and messages/events between application components. Information from this tracking may be used to generate assertions (e.g., as shown in FIG. 6). Additionally, event listeners (e.g., the instrumentation code 142 seen in FIG. 2) may be added to the browser as an extra layer between the user and the target application in order to record user actions. If all application files are received (check at 514), the toolbar 122 may be appended to the top of the application 106 within the browser 118.

FIG. 6 is a flowchart of an example recording algorithm used by the SAF of FIG. 1, in accordance with an example embodiment of the disclosure. Referring to FIGS. 1-4 and 6, the recording phase 600 may start at 602, when actions and inputs from the user to the browser 118 are recorded. Such inputs may include, for example, inputs from the computer's mouse and keyboard. After each detected action, the resulting effect on the software objects (e.g., 136, . . . , 138) of the application is captured. More specifically, the instrumentation code 142 added during the SAF initialization may be used to monitor (at 608) state changes of the software objects (136, . . . , 138) and determine how application's component are affected.

At 610, the instrumentation code 142 may also be used to detect (and record) any communication between application components (e.g., as illustrated in FIG. 2). For example, if a user were to click on a button within the application 106 during the recording phase 600, the click would be documented (including information such as the target button) along with all state changes experienced by the software objects 136, . . . , 138 with instrumentation code 142 within the application 106, as well as any messages sent between the application's components (e.g., particular to the model-view-controller (MVC) design pattern as illustrated in FIG. 2). The same state changes and messages would be expected if the same 'click' actions (as detected at 602) were to be replayed during a later session (e.g., FIG. 7).

At 612, it may be determined whether a cool-down period has elapsed (e.g., a threshold time interval) and the application has settled. If the application 106 has not settled, processing may resume at 608, where the instrumentation code 142 may continue to monitor state changes (at 608) and component communications (at 610). If the application 106 has settled, processing may resume at 604, when the recording session 600 may be stopped (e.g., a user clicks "Stop Recording" in the toolbar 122). At 606, the detected actions (e.g., at 602) may be recorded as a "use case" (or file) 128, which includes the application related events (e.g., the inputs detected at 602). Additionally, one or more assertions (e.g., baseline assertions 130) may be generated by the instrumentation code 142, based on the detected state changes and/or recorded communications.

Figure 7:
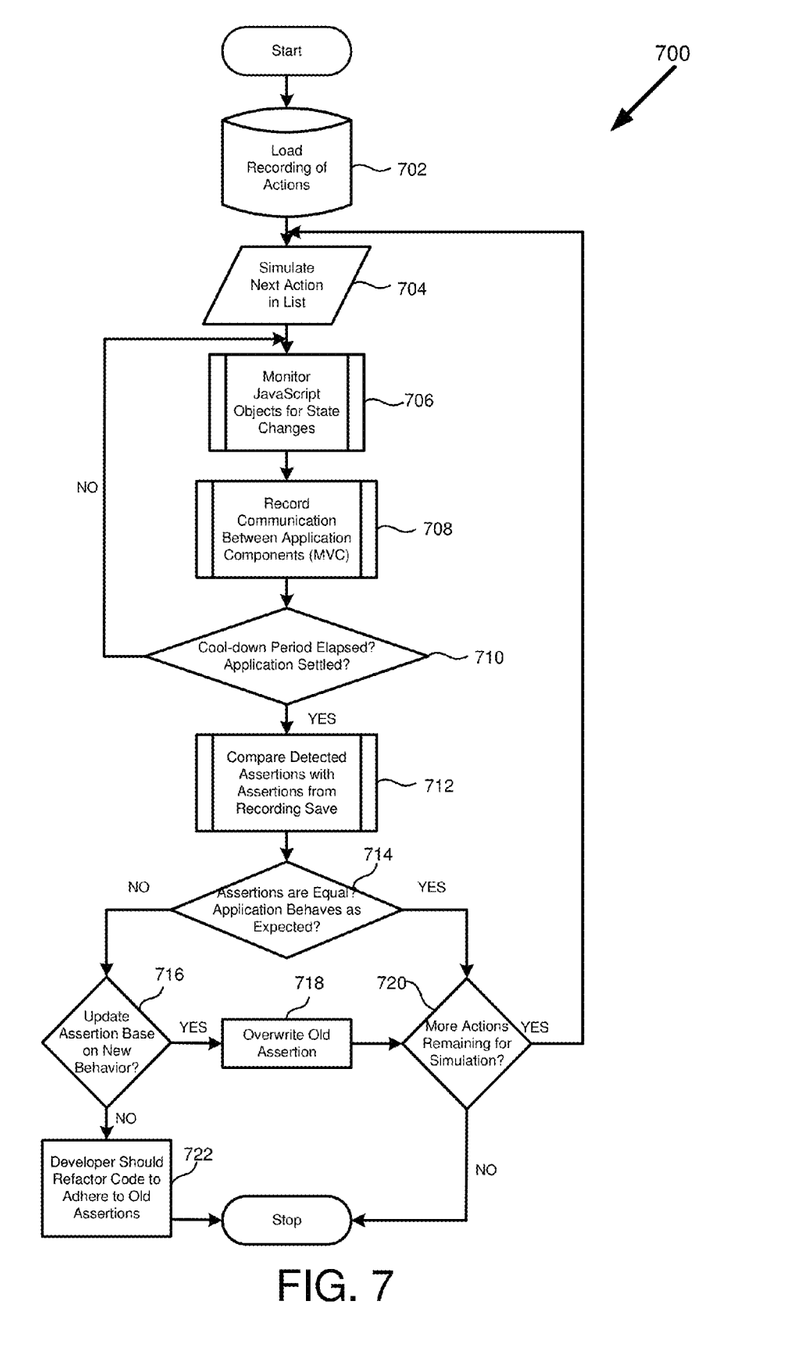
FIG. 7 is a flowchart of an example replay algorithm used by the SAF of FIG. 1, in accordance with an example embodiment of the disclosure.

FIG. 7 is a flowchart of an example replay algorithm used by the SAF of FIG. 1, in accordance with an example embodiment of the disclosure. Referring to FIGS. 1-4 and 7, instead of entering the recording phase 600, the user may opt to load and replay (using replay sequence 700) a previously recorded use case (e.g., 128) after the SAF 120 has been initialized (e.g., recording of actions, such as 128, may be loaded at 702).

After the user has selected a saved recording (e.g., 128) using the toolbar 122, the SAF 120 may be used to simulate (e.g., at 704) the recorded actions sequentially. After the simulation of each action within the use case 128, the SAF 120 may capture the same information about the software object components (e.g., 136, . . . , 138) of the application 106 as was previously captured during the recording phase (state changes as monitored and captured at 706, and component messages as detected and recorded at 708). After a cool-down period has elapsed and the application has settled at 710 (i.e., no new state change or communication is detected), processing may proceed to 712 when detected assertions (e.g., 132) from the replay sequence 700 may be compared with the benchmark/baseline assertions (e.g., 130) stored during the recording phase 600.

At 714, it may be determined if the assertions (e.g., 130 and 132) are equal, which would indicate that the application 106 behaves as expected. If the same sequence of state changes and messages are experienced, the application 106 may be considered to behave as expected. Processing may then continue at 720 and 704, if more actions remain for simulation.

If the assertions from the recording and replay phases are different, processing may continue at 716, when it may be determined whether to update the base of the baseline assertions 130 using new behavior of the application (e.g., new state changes or communications that have been detected after, for example, a change in the application code). In this regard, the SAF 120 offers the ability (at 716) to update assertions (e.g., 130) if any are deemed outdated by the user (e.g., according to the user's discretion after studying the information provided by the SAF 120). This feature allows for certain state changes to be ignored, if the developer sees them as unrepresentative of the application's behavior. In this instance (i.e., new state changes or communications between application segments are considered insignificant), then at 718, the old assertions (e.g., baseline assertions 130) may be overwritten (i.e., false assertion notifications may be ignored).

If it is determined that the assertion base should not be updated, then processing may conclude at 722, when a notification may be generated (e.g., to the code developer) so that the developer may refactor the code to adhere to the baseline assertions 130.

Figure 9:
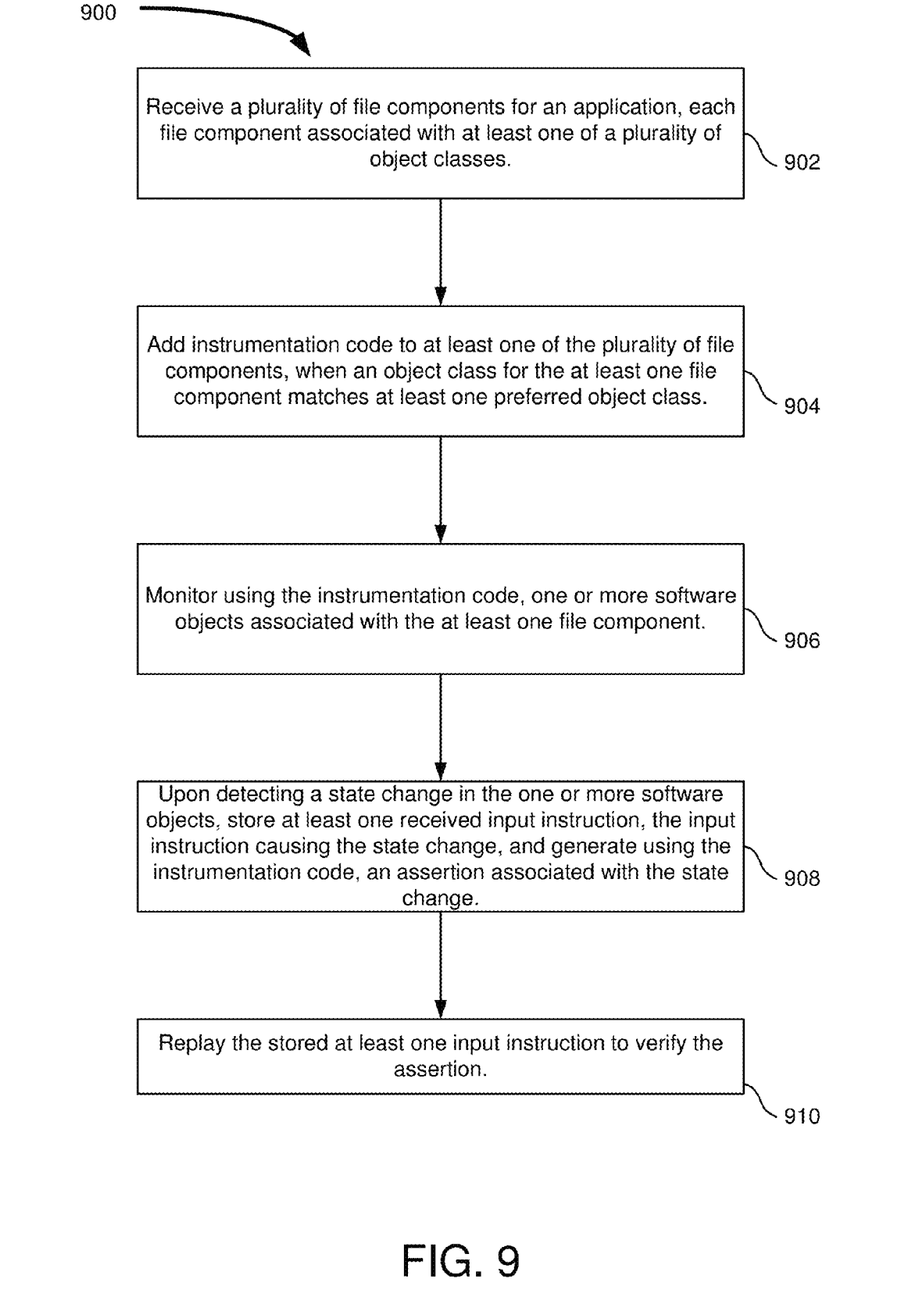
Figure 10:
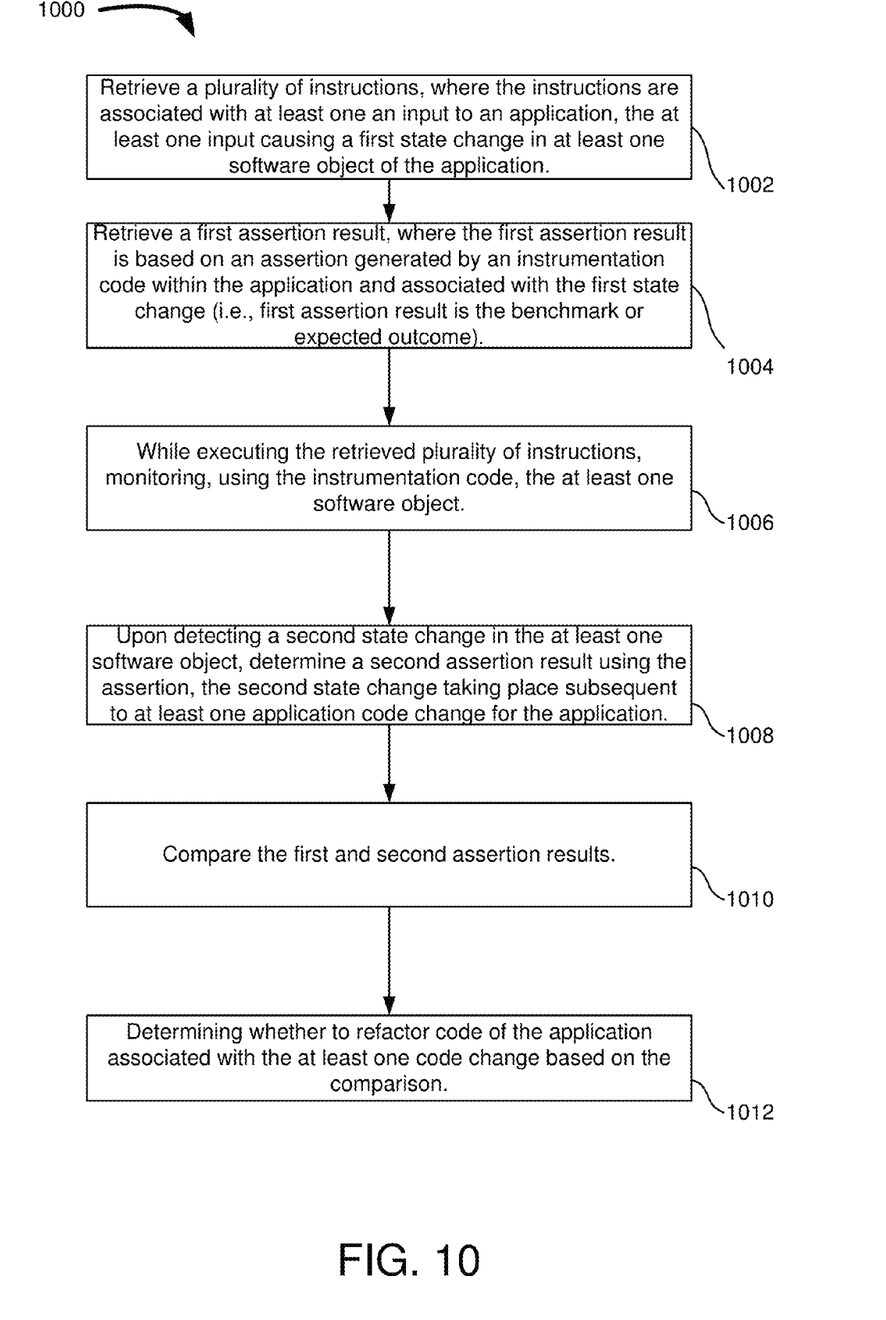

FIGS. 8-10 are flowcharts of example methods for analyzing application code changes, in accordance with an example embodiment of the disclosure. Referring to FIGS. 1-8, the example method 800 may start at 802, when the SAF 120 may add instrumentation code to a selected one or more of a plurality of software objects (e.g., 136, . . . , 138) associated with an application (106), when a corresponding object class for the selected software objects (e.g., class 1 as seen in FIG. 1) matches at least one preferred object class (e.g., matches class 114 in the configuration file 112).

At 804, in response to at least one application-related event (e.g., user input at 602), the SAF 120 may detect using the instrumentation code (142) one or more state changes of the selected software objects (e.g., at 608), or one or more communications between at least two of the selected software objects (e.g., communication events between application components, as may be detected at 610). At 806, the SAF 120 may generate using the instrumentation code (142), at least one baseline assertion (e.g., baseline assertion 130 may be generated at 606) based on the one or more state changes or communications. At 808, the SAF 120 may generate a notification upon detecting at least one subsequent assertion (e.g., 132) that does not match the at least one baseline assertion (e.g., if the baseline assertion 130 does not match the subsequent assertion 132, a notification may be provided at 716 to determine if 718 or 722 should be performed).

Referring to FIGS. 1-7 and 9, the example method 900 may start at 902, when the SAF 120 may receive a plurality of file components (e.g., files A, ..., Z) for an application (106), each file component associated with at least one of a plurality of object classes (e.g., 108, ..., 110). At 904, the SAF 120 may add instrumentation code (142) to at least one of the plurality of file components (e.g., software objects 136, ..., 138 associated with the file components of application 106), when an object class for the at least one file component (e.g., object class 1) matches at least one preferred object class (e.g., selected object classes 114-116). At 906, the SAF 120 may monitor using the instrumentation code (142), one or more software objects (e.g., 136, ..., 138) associated with the at least one file component. At 908, upon detecting a state change (e.g., at 608) in the one or more software objects, the SAF 120 may store at least one received input instruction (e.g., instruction received at 602 which may be stored as an application-related event or use case at 606), the input instruction causing the state change. The SAF 120 may generate using the instrumentation code (142), an assertion associated with the state change (e.g., baseline assertions 130). At 910, the SAF 120 may be used to replaying (e.g., during the replay sequence 700) the stored at least one input instruction (the recording of actions 128 may be loaded for replay at 702) to verify the assertion (a subsequent assertion 132 may be generated and verified against the baseline assertion 130, as described in reference to FIG. 7).

Referring to FIGS. 1-7 and 10, the example method 1000 may start at 1002, when the SAF 120 may retrieve a plurality of instructions (e.g., the instructions from 128 may be retrieved at 702). The instructions (e.g., 128) may be associated with at least one an input to an application (e.g., as detected at 602), the at least one input causing a first state change (e.g., as detected at 706) in at least one software object of the application. At 1004, the SAF 120 may retrieve a first assertion result, where the first assertion result is based on an assertion generated by an instrumentation code within the application and associated with the first state change (e.g., the first assertion result may be associated with the baseline assertion 130, which may be considered as the expected outcome).

At 1006, while executing the retrieved plurality of instructions, the SAF 120 may monitor (e.g., at 706), using the instrumentation code (142), the at least one software object. At 1008, upon detecting a second state change in the at least one software object, the SAF 120 may determine a second assertion result using the assertion (e.g., the subsequent assertion 132). For example, after the recording sequence (600) and prior to the replay sequence (700), a user (e.g., program/software developer) may perform one or more changes in the application code for the application 106. In this regard, the second state change in 1008 may be taking place after such application code change. At 1010, the SAF 120 may compare the first and second assertion results (e.g., at 712). At 1012, the SAF 120 may determine whether to refactor code of the application that is associated with the at least one application code change, based on the comparison (e.g., at 716 and 722).

Figure 11:
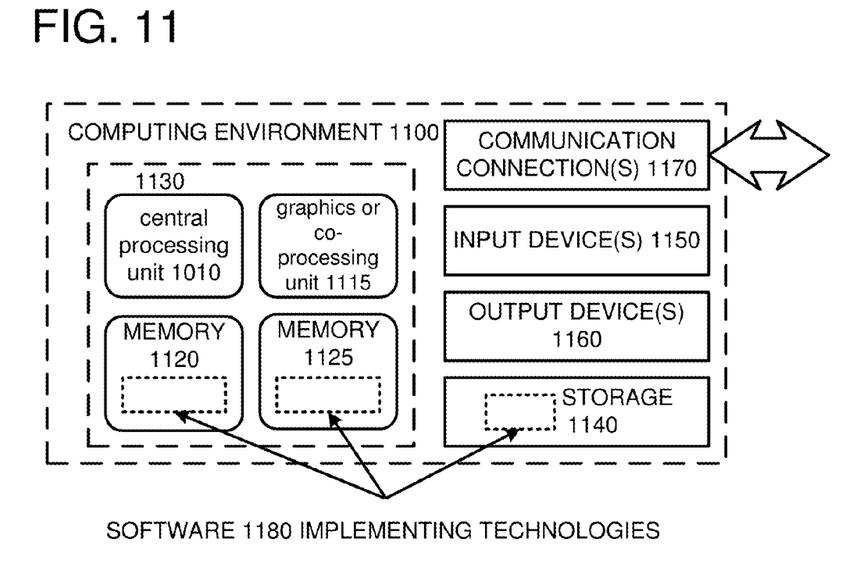
FIG. 11 is a diagram of an example computing system, in which described embodiments can be implemented.

FIG. 11 is a diagram of an example computing system, in which described embodiments can be implemented. The computing system 1100 is not intended to suggest any limitation as to scope of use or functionality, as the innovations may be implemented in diverse general-purpose or special-purpose computing systems. With reference to FIG. 11, the computing system 1100 includes one or more processing units 1110, 1115 and memory 1120, 1125 (e.g., coupled to the processing units). In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 12:
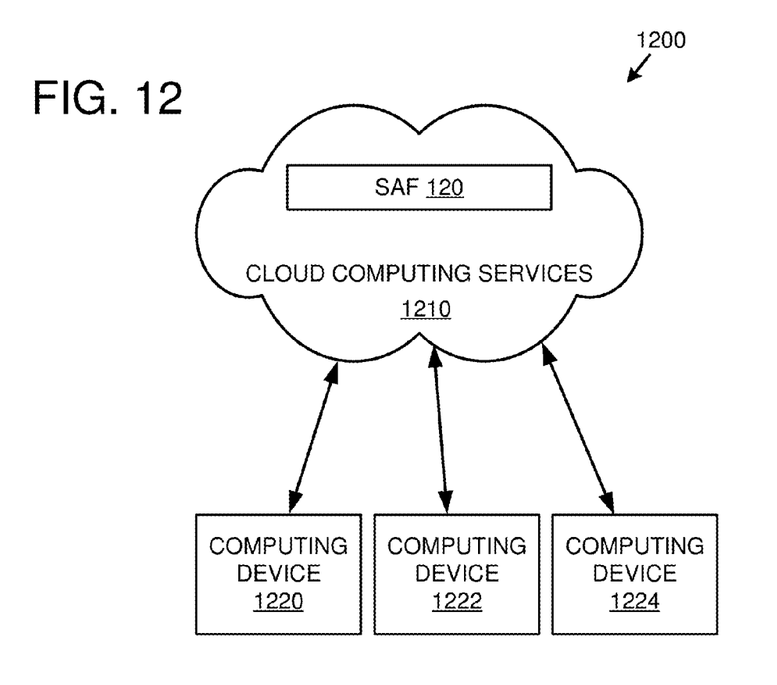
FIG. 12 is an example cloud computing environment that can be used in conjunction with the technologies described herein.

FIG. 12 is an example cloud computing environment 1200 that can be used in conjunction with the technologies described herein. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries). Additionally, the cloud computing service 1210 may implement the SAF 120 and other functionalities described herein relating to testing application code changes using a state assertion framework.

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

In accordance with an example embodiment of the disclosure, the SAF 120 allows software developers to evolve application code in a more efficient manner by, for example, improved regression testing and automation of manual testing for web-based applications (e.g., as application 106). Using techniques described herein and using the SAF 120, developers may introduce new features into their product without the issue of breaking the existing behavior of their application (regression testing). As a result, developers can reduce the amount of resources spent maintaining software. For example, before merging a newly implemented feature with an existing product, a developer may replay a previously recorded use case. During this replay, the SAF 120 can monitor the state changes experienced by the application's software objects. If the behavior of the application were acceptable (based on a comparison with the original recording's assertions), the developer would be allowed to add their feature to the existing application. If the test were to fail, the developer would need to either update the test's assertions, or refactor their code in order to not break existing application functionality (as seen in reference to FIG. 7).

Furthermore, the assertions (expected behavior) for a regression test may be updated immediately when a divergence from the benchmark is detected. By allowing developers to update assertions immediately upon failure, the SAF 120 facilitates better-maintained test cases. Additionally, by updating test cases during their execution, developers also benefit from additional contextual information regarding the test failure. The SAF can also be used to automate much of the manual testing for web applications. Instead of manually exercising use cases for an application repeatedly to ensure correct behavior, the use case can be manually exercised once and recorded for playback later. This would reduce the amount of resources spent on testing.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include communication connections (e.g., 1070) such as modulated data signals or carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method, implemented at least in part by a computing device, for analyzing application code changes, the method comprising:

by the computing device:

adding instrumentation code to a selected one or more of a plurality of software objects associated with an application, when a corresponding object class for the selected software objects matches at least one preferred object class from a list stored in a configuration file;

in response to at least one application-related event, detecting using the instrumentation code:

one or more state changes of the selected software objects; or one or more communications between at least two of the selected software objects;

generating using the instrumentation code, at least one baseline assertion based on the one or more state changes or communications; and generating a notification upon detecting at least one subsequent assertion that does not match the at least one baseline assertion.

2. The method according to claim 1, comprising:

receiving a plurality of files for the application, the plurality of files associated with one or more object classes.

3. The method according to claim 2, wherein receiving the plurality of files takes place during re-loading of the application into memory.

4. The method according to claim 1, wherein the application-related event comprises at least one of:

an input to the application; and a change in one or more of the plurality of software objects.

5. The method according to claim 1, comprising:

storing the at least one application-related event.

6. The method according to claim 5, comprising:

replaying the stored at least one application-related event to generate the at least one subsequent assertion.

7. The method according to claim 1, wherein the corresponding object class comprises one of a model object class, a view object class, or a controller object class.

8. The method according to claim 1, wherein the application is a browser-based application and the method further comprises:

subsequent to adding the instrumentation code, running the browser-based application inside a browser; and generating a user interface inside the browser-based application, the user interface for at least one of recording, playback and storing of the at least one application-related event.

9. A computer-readable storage having instructions thereon for executing a method for analyzing application code changes, the method comprising:

receiving a plurality of file components for an application, each file component associated with at least one of a plurality of object classes;

adding instrumentation code to at least one of the plurality of file components, when an object class for the at least one file component matches at least one preferred object class from a list stored in a configuration file;

monitoring using the instrumentation code, one or more software objects associated with the at least one file component;

upon detecting a state change in the one or more software objects:

storing at least one received input instruction, the input instruction causing the state change; and generating using the instrumentation code, an assertion associated with the state change; and replaying the stored at least one input instruction to generate a new assertion;

comparing the assertion with the new assertion to determine whether to update the assertion based on the comparison.

10. The computer-readable storage of claim 9, further including:
    monitoring communications associated with the at least one of the plurality of file components, the communications caused by the at least one received input instruction.

11. The computer-readable storage of claim 10, further including:
    upon detecting a communication associated with the at least one of the plurality of file components, generating using the instrumentation code, at least another assertion associated with the detected communication.

12. The computer-readable storage of claim 11, further including:
    storing the at least one input instruction, the assertion and the at least another assertion.

13. The computer-readable storage of claim 12, further including, in response to code change in at least one of the plurality of file components:
    retrieving the at least one input instruction, the assertion and the at least another assertion; and
    replaying the at least one input instruction to verify the assertion and the at least another assertion.

14. The computer-readable storage of claim 9, wherein the plurality of object classes comprises at least one of a model object class, a view object class, or a controller object class.

15. A computing device that includes a processor and a memory, the computing device being adapted to perform a method for analyzing application code changes for an application, the method comprising:
    retrieving a plurality of instructions, wherein:
        the instructions are associated with at least one an input to an application, the at least one input causing a first state change in at least one software object of the application, wherein a corresponding object class for the at least one software object matches at least one preferred object class from a list stored in a configuration file;
    retrieving a first assertion result, wherein:
        the first assertion result is based on an assertion generated by an instrumentation code within the application and associated with the first state change;
    while executing the retrieved plurality of instructions, monitoring, using the instrumentation code, the at least one software object;
    upon detecting a second state change in the at least one software object, determining a second assertion result using the assertion, the second state change taking place subsequent to at least one application code change for the application;
    comparing the first and second assertion results; and
    determining whether to refactor code of the application associated with the at least one application code change based on the comparison.

* * * * *